United States Patent
Shimizu et al.

(10) Patent No.: US 10,770,750 B2
(45) Date of Patent: Sep. 8, 2020

(54) LITHIUM ION CONDUCTOR, SOLID ELECTROLYTE LAYER, ELECTRODE, BATTERY, AND ELECTRONIC DEVICE

(71) Applicant: MURATA MANUFACTURING CO., LTD., Kyoto (JP)

(72) Inventors: Keisuke Shimizu, Kanagawa (JP); Masamitsu Suzuki, Kanagawa (JP); Tatsuya Furuya, Kanagawa (JP); Kenji Kishimoto, Kanagawa (JP); Go Sudo, Kanagawa (JP); Yasushi Tamura, Kanagawa (JP); Yumiko Yoshida, Kanagawa (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/549,447

(22) PCT Filed: Mar. 10, 2016

(86) PCT No.: PCT/JP2016/001342
§ 371 (c)(1),
(2) Date: Aug. 8, 2017

(87) PCT Pub. No.: WO2016/157751
PCT Pub. Date: Oct. 6, 2016

(65) Prior Publication Data
US 2018/0026300 A1    Jan. 25, 2018

(30) Foreign Application Priority Data
Mar. 31, 2015 (JP) .................. 2015-074278

(51) Int. Cl.
*H01M 10/0562* (2010.01)
*C03C 8/14* (2006.01)
(Continued)

(52) U.S. Cl.
CPC ......... *H01M 10/0562* (2013.01); *C03C 3/068* (2013.01); *C03C 4/14* (2013.01);
(Continued)

(58) Field of Classification Search
CPC .................. H01M 10/0562; H01M 10/0525
See application file for complete search history.

(56) References Cited

U.S. PATENT DOCUMENTS

| | | | | |
|---|---|---|---|---|
| 2009/0202903 | A1* | 8/2009 | Chiang | ............... H01M 4/0426 429/203 |
| 2012/0100433 | A1 | 4/2012 | Suyama et al. | |
| 2013/0011738 | A1* | 1/2013 | Zhou | .................... H01M 4/505 429/221 |

FOREIGN PATENT DOCUMENTS

| | | |
|---|---|---|
| JP | 5-299101 A | 11/1993 |
| JP | 2001-319520 A | 11/2001 |

(Continued)

OTHER PUBLICATIONS

Machine Translation of JP2013-045738A (Nov. 26, 2018) (Year: 2018).*
Extended European Search Report for European Patent Application No. 16771645.5, dated Jun. 27, 2018, 8 pages.
Official Action (no English translation available) for Japenese Patent Application No. 2017-509233, dated Jul. 3, 2018, 3 pages.
(Continued)

*Primary Examiner* — Matthew J Merkling
(74) *Attorney, Agent, or Firm* — Sheridan Ross P.C.

(57) ABSTRACT

A lithium ion conductor includes a first lithium ion conductor that contains at least one selected from among oxide crystals and glass ceramics, and a second lithium ion conductor that has a sintering temperature of not more than 600° C. The lithium ion conductivity of the first lithium ion conductor is higher than the lithium ion conductivity of the second lithium ion conductor.

18 Claims, 2 Drawing Sheets

1 FIRST LITHIUM ION CONDUCTOR

2 SECOND LITHIUM ION CONDUCTOR (SINTERED BODY)

(51) Int. Cl.
| | |
|---|---|
| *H01B 1/06* | (2006.01) |
| *C04B 35/00* | (2006.01) |
| *H01M 4/04* | (2006.01) |
| *H01M 2/16* | (2006.01) |
| *H01M 10/052* | (2010.01) |
| *H01M 4/133* | (2010.01) |
| *H01M 10/0525* | (2010.01) |
| *C03C 3/068* | (2006.01) |
| *C03C 4/14* | (2006.01) |
| *C03C 10/00* | (2006.01) |
| *C03C 14/00* | (2006.01) |
| *H01M 4/36* | (2006.01) |
| *H01M 4/583* | (2010.01) |
| *H01M 10/058* | (2010.01) |

(52) U.S. Cl.
CPC ............ *C03C 8/14* (2013.01); *C03C 10/0054* (2013.01); *C03C 14/006* (2013.01); *C04B 35/00* (2013.01); *H01B 1/06* (2013.01); *H01M 2/1646* (2013.01); *H01M 4/0471* (2013.01); *H01M 4/133* (2013.01); *H01M 4/364* (2013.01); *H01M 4/583* (2013.01); *H01M 10/052* (2013.01); *H01M 10/058* (2013.01); *H01M 10/0525* (2013.01); *C03C 2204/00* (2013.01); *H01M 2300/0071* (2013.01)

(56) References Cited

FOREIGN PATENT DOCUMENTS

| | | |
|---|---|---|
| JP | 2012-246167 | 12/2012 |
| JP | 2013-037992 | 2/2013 |
| JP | 2013-45738 A | 3/2013 |
| JP | 5234118 | 4/2013 |
| JP | 2013-140762 A | 7/2013 |
| JP | 2015-176854 | 10/2015 |
| JP | 2015-185462 A | 10/2015 |

OTHER PUBLICATIONS

Official Action (no translation available) for Chinese Patent Application No. 201680009553.0, dated Aug. 22, 2018, 4 pages.
International Search Report prepared by the Japan Patent Office dated Jun. 14, 2016, for International Application No. PCT/JP2016/001342.
Official Action (no translation available) for Japanese Patent Application No. 2017-509233, dated Mar. 5, 2019, 5 pages.
Official Action for European Patent Application No. 16771645.5, dated Jun. 13, 2019, 7 pages.
Official Action (no translation available) for Korean Patent Application No. 10-2017-7020802, dated Aug. 1, 2019, 5 pages.
Official Action (no English translation available) for Korean Patent Application No. 10-2017-7020802, dated Feb. 3, 2020, 3 pages.

* cited by examiner

LITHIUM ION CONDUCTOR, SOLID ELECTROLYTE LAYER, ELECTRODE, BATTERY, AND ELECTRONIC DEVICE

CROSS REFERENCE TO RELATED APPLICATIONS

This application is a national stage application under 35 U.S.C. 371 and claims the benefit of PCT Application No. PCT/JP2016/001342 having an international filing date of 10 Mar. 2016, which designated the United States, which PCT application claimed the benefit of Japanese Patent Application No. 2015-074278 filed 31 Mar. 2015, the disclosures of which are incorporated herein by reference in their entirety.

TECHNICAL FIELD

The present technology relates to a lithium ion conductor, a solid electrolyte layer, an electrode, a battery, and an electronic device.

BACKGROUND ART

In relation to oxide-based solid electrolytes for use in all-solid batteries, it is known that crystals (perovskite type and garnet type), glass ceramics and the like are high in ion conductivity. However, both in the crystals and in the glass ceramics, in order to realize a high ion conductivity, it is necessary to sinter the solid electrolyte at a high temperature of not less than 700° C.

In the case of using a solid electrolyte for battery electrodes, in general, it is necessary to fire a composite body containing an electrode active material and the solid electrolyte, thereby sintering the solid electrolyte. If the sintering temperature is high as aforementioned, however, the electrode active material and oxygen in the solid electrolyte or air might react with each other in the firing step of the composite body. For restraining such a reaction, it is desirable to set the sintering temperature at or below 600° C.

As a technology for obtaining a high lithium ion conductivity upon low-temperature sintering, the followings have been proposed, for example.

In PTL 1, it is proposed to mix and mold a garnet type compound and a phosphoric acid group-containing lithium conductor, thereby enhancing ion conductivity without performing high-temperature sintering.

In PTL 2, it is proposed to sinter a mixture containing an LAGP glass ceramic and amorphous Li—Al—Si—O, thereby obtaining a solid electrolyte sintered body that has an ion conductivity of $5 \times 10^{-5}$.

In PTL 3, it is proposed to sinter a raw material body containing a garnet type compound and $Li_3BO_3$, thereby obtaining a solid electrolyte that has an ion conductivity of approximately $4 \times 10^{-6}$.

CITATION LIST

Patent Literatures

[PTL 1]
JP 5234118B
[PTL 2]
JP 2013-45738 A
[PTL 3]
JP 2013-37992 A

SUMMARY

Technical Problem

In the technology described in PTL 1, however, the ion conductivity has a low value of approximately $2 \times 10^{-7}$ even at 50° C.

In the technology described in PTL 2, a sintering temperature of not less than 650° C. is needed.

In the technology described in PTL 3, the sintering temperature has a high value of more than 600° C. and not more than 950° C.

As aforementioned, it is difficult to realize a high ion conductivity while using a sintering temperature of not more than 600° C., both in the case where the solid electrolyte is a single material and in the case where the solid electrolyte is a combination of a plurality of materials.

It is an object of the present technology to provide a lithium ion conductor, a solid electrolyte layer, an electrode, a battery, and an electronic device by which a high lithium ion conductivity can be obtained while using a sintering temperature of not more than 600° C.

Solution to Problem

In order to solve the above-mentioned problem, a first technology resides in a lithium ion conductor including a first lithium ion conductor that contains at least one selected from among oxide crystals and glass ceramics, and a second lithium ion conductor that has a sintering temperature of not more than 600° C. A lithium ion conductivity of the first lithium ion conductor is higher than a lithium ion conductivity of the second lithium ion conductor.

A second technology resides in a solid electrolyte layer including the lithium ion conductor.

A third technology resides in an electrode including the lithium ion conductor and an active material.

A fourth technology resides in a battery including a positive electrode, a negative electrode, and an electrolyte. At least one of the negative electrode, the positive electrode, and the electrolyte includes the lithium ion conductor.

A fifth technology resides in an electronic device including the battery. The electronic device is supplied with electric power from the battery.

Advantageous Effect of Invention

As has been described, according to the present technology, a high lithium ion conductivity can be obtained while using a sintering temperature of not more than 600° C.

DESCRIPTION OF EMBODIMENTS

Embodiments of the present technology will be described below in the following order.
1. First Embodiment (Example of Lithium Ion Conductor)
1.1 Configuration of Lithium Ion Conductor
1.2 Action of Lithium Ion Conductor
1.3 Manufacturing Method of Lithium Ion Conductor
1.4 Effect
1.5 Modifications
2. Second Embodiment (Example of Battery)
2.1 Configuration of Battery
2.2 Operation of Battery
2.3 Manufacturing Method of Battery
2.4 Effect
2.5 Modifications
3. Third Embodiment (Example of Electronic Device)
3.1 Configuration of Electronic Device
3.2 Modifications

1 First Embodiment 1.1 Configuration of Lithium Ion Conductor

A lithium ion conductor according to a first embodiment of the present technology is an inorganic lithium ion conductor, and is a lithium ion conductor composite material including a first lithium ion conductor and a second lithium ion conductor. The lithium ion conductivity of the first lithium ion conductor is higher than the lithium ion conductivity of the second lithium ion conductor. Here, the lithium ion conductivity does not mean the lithium ion conductivity of a sintered product of powdery first or second lithium ion conductor but means the lithium ion conductivity of the first or second lithium ion conductor itself. In addition, the sintering temperature of the first lithium ion conductor is higher than the sintering temperature of the second lithium ion conductor. This lithium ion conductor is, for example, a powder. It is to be noted that the form of the lithium ion conductor is not limited to powder, but may be a thin film or a block.

The lithium ion conductor according to the first embodiment is preferable for use in electrochemical devices. The electrochemical devices may basically be any one, and specific examples thereof include various batteries, capacitors, gas sensors, and lithium ion filters in which lithium or the like is used. Examples of the batteries include primary batteries, secondary batteries, air batteries, and fuel batteries. The secondary battery is, for example, a lithium ion battery, and an all-solid lithium ion battery can be realized by using the lithium ion conductor according to the first embodiment as a solid electrolyte. It is to be noted, however, that the lithium ion conductor according to the first embodiment can be used both in all-solid batteries and in liquid batteries.

In the case of using the lithium ion conductor according to the first embodiment in a battery, the lithium ion conductor can be used, for example, as a solid electrolyte, a binder, or a coating agent in the battery. Note that the lithium ion conductor according to the first embodiment can also be used as a material that has the functions as two or more selected from among a solid electrolyte, a binder, and a coating agent.

Specifically, for example, a solid electrolyte layer may be formed by using the lithium ion conductor according to the first embodiment, or the lithium ion conductor according to the first embodiment may be contained in an electrode or an active material layer as a solid electrolyte and/or a binder.

In addition, by use of the lithium ion conductor according to the first embodiment, a ceramic green sheet (hereinafter referred to simply as "green sheet") as a solid electrolyte layer precursor, an electrode layer precursor, or an active material layer precursor or a green compact may be formed, or a sintered body as a solid electrolyte layer, an electrode, or an active material layer may be formed.

Besides, the lithium ion conductor according to the first embodiment may be used as a surface coating agent for coating at least some of surfaces of electrode active material particles. In this case, a reaction between a liquid electrolyte and an electrode active material can be restrained. For example, in the case where the lithium ion conductor according to the first embodiment is used as a surface coating agent for positive electrode active material particles such as LCO ($LiCoO_2$) based particles and NCM ($Li[NiMnCo]O_2$) particles, release of oxygen from the positive electrode active material particles can be restrained.

In addition, in a sulfur-based all-solid battery, the lithium ion conductor according to the first embodiment may be used as a surface coating agent for an electrode active material particles in order to restrain a reaction between the electrode active material and a sulfur-based solid electrolyte.

Besides, the lithium ion conductor according to the first embodiment may be used as an additive added to a battery separator or as a coating agent for coating the surface of the battery separator. In this case, safety of the battery can be enhanced.

(First Lithium Ion Conductor)

The first lithium ion conductor has a lithium ion conductivity higher than that of the second lithium ion conductor, and has a sintering temperature higher than that of the second lithium ion conductor. The sintering temperature of the first lithium ion conductor is more than 600° C. and not more than 1,100° C., preferably 700° C. to 1,100° C.

The first lithium ion conductor preferably contains at least one selected from among crystals and glass ceramics. More specifically, the first lithium ion conductor preferably contains at least one selected from among oxide crystal-based lithium ion conductors and oxide glass ceramic-based lithium ion conductors. This is because a high lithium ion conductivity can be obtained thereby. Here, the oxide crystal-based lithium ion conductor refers to a lithium ion conductor composed of an oxide crystal. In addition, the oxide glass ceramic-based lithium ion conductor refers to a lithium ion conductor composed of an oxide glass ceramic.

As the oxide crystal-based lithium ion conductor, there can be used, for example, perovskite type oxide crystals composed of La—Li—Ti—O or the like, and garnet type oxide crystals composed of Li—La—Zr—O or the like. As the oxide glass ceramic-based lithium ion conductor, there can be used, for example, phosphoric acid compounds containing lithium, aluminum, and titanium as constituent elements (LATP), and a phosphoric acid compounds containing lithium, aluminum, and germanium as constituent elements (LAGP).

Here, the crystal is not limited to single crystals, but includes polycrystals in which a multiplicity of crystal grains are aggregated. The crystal refers to a substance which is a single crystal or a polycrystal on a crystallographic basis, such that, for example, a peak is observed in X-ray diffraction and/or electron diffraction thereof. The glass ceramic (crystallized glass) refers to a crystallized glass in which an amorphous phase and a crystalline phase are mixedly present, such that, for example, a peak and a halo are observed in X-ray diffraction and/or electron diffraction thereof, or a crystallized glass which is a single crystal or a polycrystal on a crystallographic basis, such that, for example, a peak is observed in X-ray diffraction and/or electron diffraction thereof.

(Second Lithium Ion Conductor)

The second lithium ion conductor has a lithium ion conductivity lower than that of the first lithium ion conductor, and has a sintering temperature lower than that of the first lithium ion conductor. The sintering temperature of the second lithium ion conductor is not more than 600° C., preferably 300° C. to 600° C., and further preferably 300° C. to 500° C. When the sintering temperature is not more than 600° C., it is possible to restrain the lithium ion conductor and electrode active materials from reacting with each other in the firing step (sintering step) to form by-products such as a non-conductor. Therefore, it is possible to restrain battery characteristics from being lowered. In addition, since the choice of the kind of the electrode active materials is widened, the degree of freedom in designing the battery can be enhanced. When the sintering temperature is not more than 500° C., carbon materials can be used as a negative electrode active material. Therefore, energy density of the battery can be enhanced. Besides, since carbon materials can be used as a conductive agent, it is possible to form favorable electron conduction paths in an electrode layer or an electrode active material layer, and thereby to enhance conductivity of the electrode layer or the electrode active material layer. On the other hand, when the sintering temperature is not less than 300° C., an organic binder such as acrylic resin contained in an electrode precursor and/or a solid electrolyte precursor can be burned away in the firing step (sintering step).

The second lithium ion conductor preferably contains a glass. More specifically, the second lithium ion conductor preferably is an oxide glass-based lithium ion conductor. Here, the oxide glass-based lithium ion conductor refers to a lithium ion conductor composed of an oxide glass. The oxide glass-based lithium ion conductor is preferably a glass containing at least one selected from among Ge (germanium), Si (silicon), B (boron), and P (phosphorus) as well as Li (lithium) and O (oxygen), and is more preferably a glass containing Si (silicon), B (boron), Li (lithium), and O (oxygen). Specifically, the oxide glass-based lithium ion conductor is preferably a glass containing at least one selected from among $GeO_2$, $SiO_2$, $B_2O_3$, and $P_2O_3$ as well as $Li_2O$, and more preferably a glass containing $SiO_2$, $B_2O_3$, and $Li_2O$.

Here, the glass refers to an amorphous substance on a crystallographic basis such that a halo is observed in X-ray diffraction and/or electron diffraction thereof.

The content of $Li_2O$ is 20 to 75 mol %, preferably more than 25 mol % and not more than 75 mol %, more preferably 30 to 75 mol %, still more preferably 40 to 75 mol %, and particularly preferably 50 to 75 mol %. In the case where the oxide glass-based lithium ion conductor contains $GeO_2$, the content of $GeO_2$ is preferably more than 0 mol % and not more than 80 mol %. Where the oxide glass-based lithium ion conductor contains $SiO_2$, the content of $SiO_2$ is preferably more than 0 mol % and not more than 70 mol %. Where the oxide glass-based lithium ion conductor contains $B_2O_3$, the content of $B_2O_3$ is preferably more than 0 mol % and not more than 60 mol %. Where the oxide glass-based lithium ion conductor contains $P_2O_3$, the content of $P_2O_3$ is preferably more than 0 mol % and not more than 50 mol %. Note that the content of each of the above-mentioned oxides is the content of the oxide in the oxide glass-based lithium ion conductor, specifically, the proportion of the content (mol) of each oxide based on the total amount (mol) of at least one selected from among $GeO_2$, $SiO_2$, $B_2O_3$, and $P_2O_5$, and $Li_2O$ as expressed in percentage (mol %). The content of each oxide can be measured by the inductively coupled plasma atomic emission spectroscopy (ICP-AES) or the like.

The oxide glass-based lithium ion conductor may further contain additive elements, as required. Examples of the additive elements include at least one selected from the group consisting of Na (sodium), Mg (magnesium), Al (aluminum), K (potassium), Ca (calcium), Ti (titanium), V (vanadium), Cr (chromium), Mn (manganese), Fe (iron), Co (cobalt), Ni (nickel), Cu (copper), Zn (zinc), Ga (gallium), Se (selenium), Rb (rubidium), S (sulfur), Y (yttrium), Zr (zirconium), Nb (niobium), Mo (molybdenum), Ag (silver), In (indium), Sn (tin), Sb (antimony), Cs (cesium), Ba (barium), Hf (hafnium), Ta (tantalum), W (tungsten), Pb (lead), Bi (bismuth), Au (gold), La (lanthanum), Nd (neodymium), and Eu (europium). The oxide glass-based lithium ion conductor may contain at least one selected from the group consisting of these additive elements as an oxide.

In a state where the second lithium ion conductor has been sintered, the lithium ion conductivity of the lithium ion conductor is preferably not less than $5 \times 10^{-7}$ S/cm. The average particle diameter of the first lithium ion conductor is preferably equal to or greater than the average particle diameter of the second lithium ion conductor. This is because lithium ion conductivity can be enhanced thereby. The volume proportion of the first lithium ion conductor is preferably equal to or greater than the volume proportion of the second lithium ion conductor. This is because lithium ion conductivity can be enhanced thereby. Here, the volume proportion of the first lithium ion conductor is the proportion of the volume of the first lithium ion conductor based on the total volume of the first and second lithium ion conductors as expressed in percentage. Also, the volume proportion of the second lithium ion conductor is the proportion of the volume of the second lithium ion conductor based on the total volume of the first and second lithium ion conductor as expressed in percentage.

The average particle diameter of the first lithium ion conductor is determined, for example, as follows. First, a scanning electron microscope (SEM) image of the lithium ion conductor is picked up by use of an SEM. Next, ten particles of the first lithium ion conductor are selected at random from the SEM image picked up, and respective maximum lengths across the particles (maximum lengths across the particles in a plane observed on the SEM image) are determined as particle diameters (diameters). The process of determining the particle diameter as above-mentioned is conducted for ten SEM images, and the 100 (=10×10) particle diameters of the first lithium ion conductor are simply averaged (arithmetic mean) to obtain the average particle diameter.

The average particle diameter of the second lithium ion conductor can be determined, for example, by the same method as that for the average particle diameter of the first lithium ion conductor as above-mentioned.

The volume proportions of the first and second lithium ion conductors can be determined, for example, as follows. First, an SEM image of the lithium ion conductor is picked up by use of an SEM. Next, ten particles of the first lithium ion conductor are selected at random from the SEM image picked up, and respective maximum lengths across the particles (the maximum lengths across the particles in the plane observed on the SEM image) are determined as particle diameters (diameters) D1. Subsequently, assuming that the particles of the first lithium ion conductor are spherical particles, volumes v1 $(=\pi(D1)^3/6)$ of the ten particles of the first lithium conductor are respectively obtained by use of the particle diameters D1 determined. The process of obtaining the volume v1 as aforementioned is conducted for ten SEM images, and a sum total V1 of the volumes v1 of the 100 (=10×10) particles of the first lithium ion conductor obtained is determined.

Next, a sum total V2 of volumes v2 of 100 particles of the second lithium ion conductor is determined by the same method as that for determining the volume V1 of the first lithium ion conductor. Subsequently, using the volumes V1 and V2 of the first and second lithium ion conductors obtained as aforementioned, the volume proportion ([V1/(V1+V2)]×100(%)) of the volume V1 of the first lithium ion conductor based on the total volume (V1+V2) of the first and second lithium ion conductors is determined. Also, the volume proportion ([V2/(V1+V2)]×100(%)) of the volume V2 of the second lithium ion conductor based on the total volume (V1+V2) of the first and second lithium ion conductors is determined.

1.2 Action of Lithium Ion Conductor

Figure 1:
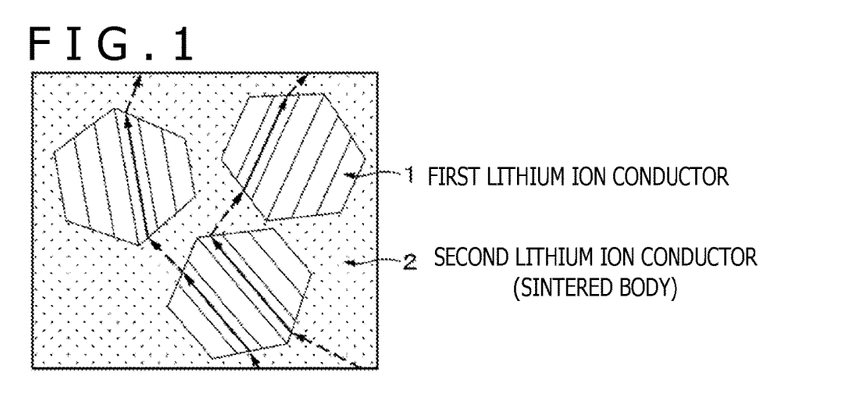
FIG. 1 is a schematic view for explaining a function of a lithium ion conductor according to a first embodiment of the present invention.

FIG. 1 schematically depicts a lithium ion conductor in a state in which a second lithium ion conductor 2 of first and second lithium ion conductors 1 and 2 has been sintered. In the lithium ion conductor in the state depicted in FIG. 1, the first lithium ion conductor 1 has a function as a main lithium ion conduction path, whereas the second lithium ion conductor 2 has a function of physically and ion-conductively connect the first lithium ion conductor 1. As aforementioned, therefore, from the viewpoint of enhancing lithium ion conductivity, the average particle diameter of the first lithium ion conductor 1 is preferably greater than the average particle diameter of the second lithium ion conductor 2. In addition, from the viewpoint of enhancing the lithium ion conductivity, the volume proportion of the first lithium ion conductor 1 is preferably greater than the volume proportion of the second lithium ion conductor 2.

1.3 Manufacturing Method of Lithium Ion Conductor

An example of a method of manufacturing the lithium ion conductor according to the first embodiment of the present technology will be described below.

An oxide glass-based lithium ion conductor as the second lithium ion conductor is produced as follows. First, as raw material, at least one selected from among $GeO_2$, $SiO_2$, $B_2O_3$, and $P_2O_5$ and $Li_2O$ are mixed together. The amounts of $GeO_2$, $SiO_2$, $B_2O_3$, and $P_2O_5$ as well as $Li_2O$ blended are, for example, the same as the contents of these materials in the above-mentioned oxide glass-based lithium ion conductor. Note that as the raw material, above-mentioned additive elements or oxides thereof or the like may further be mixed, as required.

Next, the raw material is vitrified, to thereby produce the oxide glass-based lithium ion conductor. Examples of the method for vitrifying the raw material include not only a method of melting the raw material to obtain a melt and letting the melt to cool, a method of pressing a melt by a metallic plate or the like, a method of throwing the melt into mercury, a strip furnace, splat rapid cooling, a roll method (single or twin), but also a mechanical milling method, a sol-gel method, a vapor deposition method, a sputtering method, a laser ablation method, a pulse laser deposition (PLD) method, and a plasma method.

Subsequently, the oxide glass-based lithium ion conductor is pulverized. Examples of the method for pulverization include a mechanochemical method. By the above-mentioned operations, a powder of the oxide glass-based lithium ion conductor is obtained.

The second lithium ion conductor obtained as above-mentioned is mixed with the first lithium ion conductor, whereby the desired lithium ion conductor is obtained.

1.4 Effect

The powder of the lithium ion conductor according to the first embodiment contains the first lithium ion conductor (for example, an oxide crystal, an oxide ceramic or the like) which has a high lithium ion conductivity by itself and a high sintering temperature exceeding 600° C., and the second lithium ion conductor (for example, a glass or the like) of which the lithium ion conductivity is not so high and which has a low sintering temperature of not more than 600° C. This ensures that when the lithium ion conductor is fired at or below 600° C., the second lithium ion conductor is sintered, to connect the first lithium ion conductor physically and ion-conductively. Therefore, at a firing temperature (sintering temperature) of not more than 600° C., a high lithium ion conductivity is obtained.

In the case where the first lithium ion conductor is a crystalline material and the second lithium ion conductor is a glass, a structure results in which gaps in a rigid crystalline material are filled up with a small-particle relatively soft glass. Therefore, the gaps and the like in the lithium ion conductor are lessened, and resistance against shock and the like are enhanced. Accordingly, in the case where an all-solid battery is produced by use of the lithium ion conductor according to the first embodiment, generation of internal short-circuit of the battery can be restrained, and reliability upon dropping or the like can be enhanced.

1.5 Modifications

The oxide glass-based lithium ion conductor as the second lithium ion conductor may contain at least two, at least three, or all four of Ge, Si, B, and P as well as Li and O. Specifically, the oxide glass-based lithium ion conductor may contain at least two, at least three, or all four of $GeO_2$, $SiO_2$, $B_2O_3$, and $P_2O_5$ together with $Li_2O$.

While a case where the lithium ion conductor is a lithium ion conductor composite material containing two kinds of lithium ion conductors has been described as an example in the first embodiment above, the lithium ion conductor may be a lithium ion conductor composite material containing two or more kinds of lithium ion conductors. For instance, the lithium ion conductor may be a lithium ion conductor composite material containing one or more kinds of first lithium ion conductors and two or more kinds of second lithium ion conductors, or may be a lithium ion conductor composite material containing two or more kinds of first lithium ion conductors and one or more kinds of second lithium ion conductors.

While a case where the first lithium ion conductor is an oxide-based lithium ion conductor has been described as an example in the first embodiment above, the first lithium ion conductor may contain a sulfide-based lithium ion conductor or may contain both oxide-based and sulfide-based lithium ion conductors.

As the oxide-based lithium ion conductor of the first lithium ion conductor, there may be used a crystallized second lithium ion conductor, specifically, a crystallized oxide glass-based lithium ion conductor. The crystallized oxide glass-based lithium ion conductor is produced by heat-treating the oxide glass-based lithium ion conductor at a temperature above the crystallization temperature to thereby promote crystallization. The crystallized oxide glass-based lithium ion conductor is a so-called glass ceramic.

Table 1 depicts examples of combination of the first lithium ion conductor and the second lithium ion conductor.

TABLE 1

| | First lithium ion conductor (High ion conduction material) | Second lithium ion conductor (Low sintering temperature material) |
|---|---|---|
| Combination (1) | Crystal-based lithium ion conductor | Glass-based lithium ion conductor |
| Combination (2) | Crystal-based lithium ion conductor | Glass-based lithium ion conductor crystallized in sintering step (Glass ceramic-based lithium ion conductor) |
| Combination (3) | Crystallized glass-based lithium ion conductor (Glass ceramic-based lithium ion conductor) | Glass-based lithium ion conductor |
| Combination (4) | Crystallized glass-based lithium ion conductor (Glass ceramic-based lithium ion conductor) | Glass-based lithium ion conductor crystallized in sintering step (Glass ceramic-based lithium ion conductor) |

While a case where the sintering temperature of the first lithium ion conductor is more than 600° C. and not more than 1,100° C. has been described as an example in the first embodiment, the sintering temperature of the first lithium ion conductor may be not more than 600° C. As the first lithium ion conductor having a sintering temperature of not more than 600° C., there can be used a crystallized second lithium ion conductor, namely a crystallized oxide glass-based lithium ion conductor. The crystallized oxide glass-based lithium ion conductor has a high interface resistance and a low ion conductivity, and, therefore, portions of the crystallized oxide glass-based lithium ion conductor are physically and ion-conductively connected by the sintered second lithium ion conductor, whereby a high lithium ion conductivity is obtained.

2 Second Embodiment

In a second embodiment, a battery wherein a sintered body of the lithium ion conductor according to the first embodiment as aforementioned is contained in a positive electrode, a negative electrode, and a solid electrolyte layer as a solid electrolyte will be described. Here, the sintered body of the lithium ion conductor means a sintered body of the second lithium ion conductor, out of the first and second lithium ion conductors contained in the lithium ion conductor.

2.1 Configuration of Battery

Figure 2:
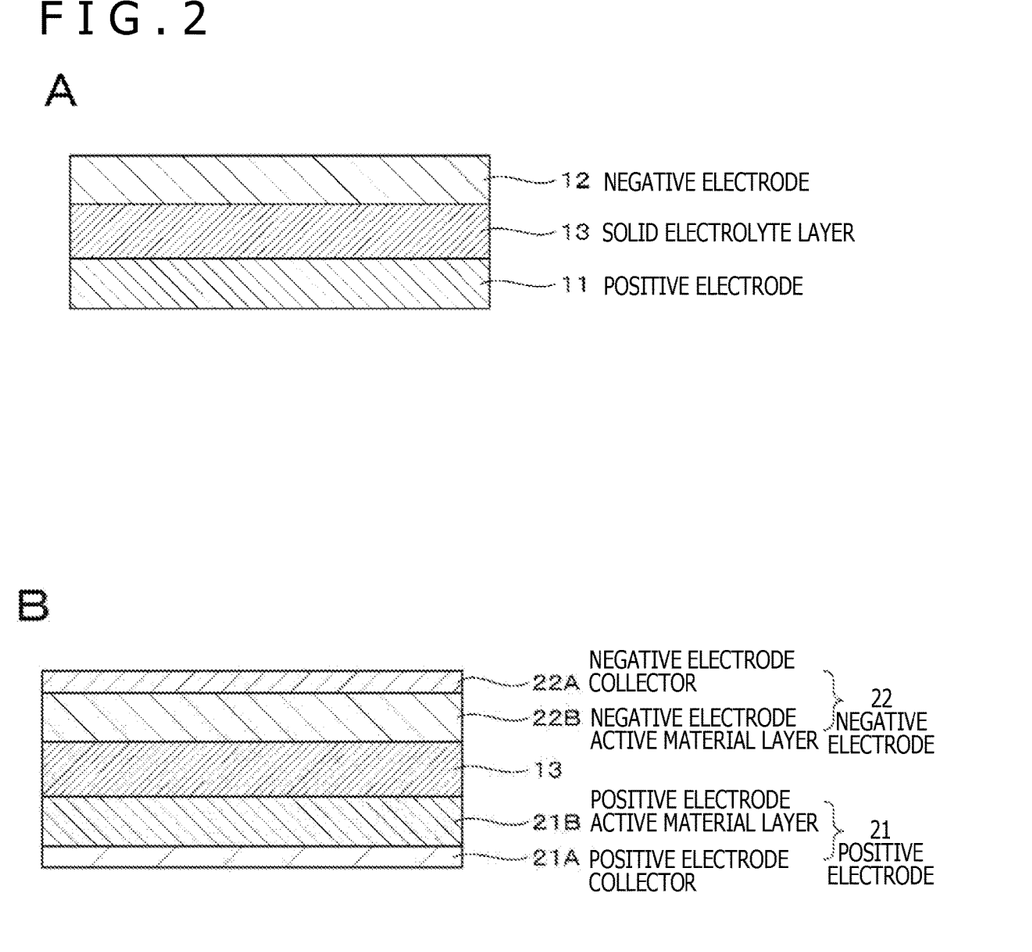
FIG. 2A is a sectional view depicting a configuration of a battery according to a second embodiment of the present technology.
FIG. 2B is a sectional view depicting a configuration of a battery according to a modification of the second embodiment of the present invention.

A battery according to the second embodiment of the present technology is a so-called bulk type all-solid battery, which includes a positive electrode 11 and a negative electrode 12 and a solid electrolyte layer 13 as depicted in FIG. 2A. The solid electrolyte layer 13 is provided between the positive electrode 11 and the negative electrode 12. This battery is a secondary battery in which a battery capacity is repeatedly obtained by donation and reception of Li as an electrode reactant, and may be a lithium ion secondary battery in which a capacity of a negative electrode is obtained by occlusion and release of lithium ions, or may be a lithium metal secondary battery in which a capacity of a negative electrode is obtained by precipitation and dissolution of lithium metal.

(Positive Electrode)

The positive electrode 11 is a positive electrode active material layer containing one or more positive electrode active materials and a solid electrolyte. The solid electrolyte may have a function as a binder. The positive electrode 11 may further contain a conductive agent, as required. The positive electrode 11 is, for example, a fired body of a green sheet as a positive electrode precursor (hereinafter referred to as "positive electrode green sheet").

The positive electrode active material contains, for example, a positive electrode material capable of occlusion and release of lithium ions as an electrode reactant. This positive electrode material is preferably a lithium-containing compound or the like, from the viewpoint that a high energy density is obtained thereby, but this is not restrictive. This lithium-containing compound is, for example, a composite oxide containing lithium and a transition metal element as constituent elements (lithium-transition metal composite oxide), a phosphoric acid compound containing lithium and a transition metal element as constituent elements (lithium-transition metal phosphoric acid compound) or the like. Among others, the transition metal element is preferably one or more selected from among Co, Ni, Mn, and Fe. This is because a higher voltage is obtained thereby.

The lithium-transition metal composite oxide is represented, for example, by $Li_xM1O_2$ or $Li_yM2O_4$ or the like. More specifically, the lithium-transition metal composite oxide is, for example, $LiCoO_2$, $LiNiO_2$, $LiVO_2$, $LiCrO_2$, $LiMn_2O_4$ or the like. In addition, the lithium-transition metal phosphoric acid compound is represented, for example, by $Li_zM3PO_4$ or the like. More specifically, the lithium-transition metal phosphoric acid compound is, for example, $LiFePO_4$, $LiCoPO_4$ or the like. It is to be noted here that M1 to M3 are each one or more transition metal elements, and the values of x to z are arbitrary.

In addition, the positive electrode active material may be, for example, an oxide, a disulfide, a chalcogenide, a conductive polymer or the like. The oxide is, for example, titanium oxide, vanadium oxide, manganese dioxide or the like. The disulfide is, for example, titanium disulfide, molybdenum disulfide or the like. The chalcogenide is, for example, niobium selenide or the like. The conductive polymer is, for example, sulfur, polyaniline, polythiophene or the like.

The positive electrode active material is a powder of positive electrode active material particles. Surfaces of the positive electrode active material particles may be coated with a coating agent. Here, the coating may be such that the surfaces of the positive electrode active material particles are entirely coated or that the surfaces of the positive electrode active material particles are partly coated. The coating agent is, for example, at least one selected from among solid electrolytes and conductive agents. By coating the surfaces of the positive electrode active material particles with the coating agent, the interface resistance between the positive electrode active material particle and the solid electrolyte can be lowered. In addition, since collapse of the structure of the positive electrode active material particles can be restrained, sweep potential width can be widened, more lithium can be used for reaction, and cycle characteristics can be enhanced.

The solid electrolyte is a sintered body of the lithium ion conductor according to the first embodiment described above. Note that the solid electrolyte as the coating agent for the above-mentioned positive electrode active material particles may also be a sintered body of the lithium ion conductor according to the first embodiment described above.

The conductive agent contains, for example, carbon material, metal, metallic oxide, conductive polymer or the like either singly or in combination of two or more of them. As the carbon material, there can be used, for example, graphite, carbon fiber, carbon black, carbon nanotube and the like, either singly or in combination of two or more of them. As the carbon fiber, there can be used, for example, vapor growth carbon fiber (VGCF) and the like. As the carbon black, there can be used, for example, acetylene black, Ketjen Black and the like. As the carbon nanotube, there can be used, for example, single-walled carbon nanotube (SW-CNT), multi-walled carbon nanotube (MWCNT) such as double-walled carbon nanotube (DWCNT) and the like. As the metal, there can be used, for example, a Ni powder and the like. As the metallic oxide, there can be used, for example, $SnO_2$ and the like. As the conductive polymer, there can be used, for example, substituted or non-substituted polyaniline, polypyrrole, polythiophene, (co)polymers composed of one or more selected from among them, and the like. Note that the conductive agent is not limited to the above-mentioned examples, but may be any material that is electrically conductive.

(Negative Electrode)

The negative electrode 12 is a negative electrode active material layer containing one or more negative electrode active materials and a solid electrolyte. The solid electrolyte may have a function as a binder. The negative electrode 12 may further contain a conductive agent, as required. The negative electrode 12 is, for example, a fired body of a green sheet as a negative electrode precursor (hereinafter referred to as "negative electrode green sheet").

The negative electrode active material contains, for example, a negative electrode material capable of occlusion and release of lithium ions as an electrode reactant. The negative electrode material is preferably a carbon material or a metal-based material or the like, from the viewpoint that a high energy density can be obtained thereby, but is not limited thereto.

The carbon material is, for example, easily graphitizable carbon, difficultly graphitizable carbon, graphite, mesocarbon microbeads (MCMB), highly oriented graphite (HOPG) or the like.

The metal-based material is, for example, a material containing as a constituent element a metallic element or semi-metallic element capable of forming an alloy with lithium. More specifically, the metal-based material is, for example, one or more selected from among simple substances, alloys, or compounds of Si, Sn, Al, In, Mg, B, Ga, Ge, Pb, Bi, Cd (cadmium), Ag, Zn, Hf, Zr, Y, Pd (palladium), Pt (platinum) and the like. It is to be noted here that the simple substance is not limited to those having a purity of 100%, but may contain traces of impurities. Specific examples of the metal-based material include Si, Sn, $SiB_4$, $TiSi_2$, SiC, $Si_3N_4$, $SiO_v$ (0<v≤2), LiSiO, $SnO_w$ (0<w≤2), $SnSiO_3$, LiSnO, and $Mg_2Sn$.

The metal-based material may be a lithium-containing compound or lithium metal (lithium as simple substance). The lithium-containing compound is a composite oxide containing lithium and a transition metal element as constituent elements (lithium-transition metal composite oxide). Examples of the composite oxide include $Li_4Ti_5O_{12}$.

The negative electrode active material is a powder of negative electrode active material particles. Surfaces of the negative electrode active material particles may be coated with a coating agent. Here, the coating is not limited to such that the surfaces of the negative electrode active material particles are entirely coated, but may be such that the surfaces of the negative electrode active material particles are partly coated. The coating agent is at least one selected from among solid electrolytes and conductive agents. By coating the surfaces of the negative electrode active material particles with the coating agent, interface resistance between the negative electrode active material particle and the solid electrolyte can be lowered. In addition, since collapse of the structure of the negative electrode active material particles can be restrained, sweep potential width can be widened, more lithium can be used for reaction, and cycle characteristics can be enhanced.

The solid electrolyte is a sintered body of the lithium ion conductor according to the first embodiment described above. Note that the solid electrolyte as the coating agent for the above-mentioned negative electrode active material particles may also be a sintered body of the lithium ion conductor according to the first embodiment described above.

The conductive agent is similar to the conductive agent in the positive electrode 11 described above.

(Solid Electrolyte Layer)

The solid electrolyte layer 13 contains a sintered body of the lithium ion conductor according to the first embodiment described above. The solid electrolyte layer 13 is, for example, a fired body of a green sheet as a solid electrolyte layer precursor (hereinafter referred to as "solid electrolyte green sheet").

2.2 Operation of Battery

In this battery, for example, during charging, lithium ions released from the positive electrode 11 are taken into the negative electrode 12 through the solid electrolyte layer 13, and, during discharging, lithium ions released from the negative electrode 12 are taken into the positive electrode 11 through the solid electrolyte layer 13.

2.3 Manufacturing Method of Battery

An example of a method of manufacturing the battery according to the second embodiment of the present technology will be described below. The manufacturing method includes a step of forming a positive electrode precursor, a negative electrode precursor, and a solid electrolyte layer precursor, and a step of stacking and firing these precursors. Note that in the battery manufacturing method, a case where all of the positive electrode precursor, the negative electrode precursor, and the solid electrolyte layer precursor contain the lithium ion conductor according to the first embodiment will be described as an example.

(Step of Forming Positive Electrode Precursor)

The positive electrode green sheet as the positive electrode precursor is formed as follows. First, the positive electrode active material, the lithium ion conductor (solid electrolyte) according to the first embodiment, an organic binder, and optionally a conductive agent are mixed together to prepare a positive electrode mixture powder as a raw material powder, after which the positive electrode mixture powder is dispersed in an organic solvent or the like, to obtain a positive electrode slurry as a positive electrode green sheet forming composition. Note that the dispersion may be conducted dividedly by several runs, for enhancing dispersibility of the positive electrode mixture powder.

As the organic binder, there can be used, for example, such organic binders as acrylic resins. The solvent is not particularly limited so long as it can disperse the positive electrode mixture powder therein, and it is preferably one that is burned away in a temperature range lower than the firing temperature for the green sheet. As the solvent, there can be used, for example, lower alcohols of not more than four carbon atoms, such as methanol, ethanol, isopropanol, n-butanol, sec-butanol, t-butanol, etc., aliphatic glycols such as ethylene glycol, propylene glycol (1,3-propanediol), 1,3-propanediol, 1,4-butanediol, 1,2-butanediol, 1,3-butandiol, 2-methyl-1,3-propanediol, etc., ketones such as methyl ethyl ketone, etc., amines such as dimethylethylamine, etc., alicyclic alcohols such as terpineol, either singly or as a mixture of two or more of them, but the solvent is not particularly limited to the just-mentioned ones. Examples of the dispersing method include an agitating treatment, an ultrasonic dispersing treatment, a bead dispersing treatment, a kneading treatment, and a homogenizer treatment.

Next, if necessary, the positive electrode slurry may be filtrated by a filter to thereby remove foreign matters present in the positive electrode slurry. Subsequently, if necessary, the positive electrode slurry may be subjected to vacuum deaeration for removing bubbles present in the slurry.

Next, a positive electrode slurry layer is formed by, for example, uniformly applying or printing the positive electrode slurry onto a surface of a support base material. As the support base material, there can be used, for example, a film of a polymeric resin such as polyethylene terephthalate (PET). As an applying (coating) or printing method, a method which is easy and suitable for mass production is preferably used. As the coating method, there can be used, for example, a die coating method, a micro-gravure coating method, a wire bar coating method, a direct gravure coating method, a reverse roll coating method, a comma coating method, a knife coating method, a spray coating method, a curtain coating method, a dipping method, a spin coating method, and the like, but the coating method is not particularly limited to the just-mentioned ones. As the printing method, there can be used, for example, a relief printing method, an offset printing method, a gravure printing method, an intaglio printing method, a rubber plate printing method, a screen printing method, and the like, but the printing method is not particularly limited to the just-mentioned ones.

For facilitating peeling of the positive electrode green sheet from the surface of the support base material in a later step, it is preferable to preliminarily subject the surface of the support base material to a release treatment. Examples of the release treatment include a method in which a composition for imparting releasability is preliminarily applied or printed onto the surface of the support base material. Examples of the releasability-imparting composition include coating materials containing a binder as a main constituent and containing a wax, fluorine or the like added thereto, and silicone resins.

Subsequently, the positive electrode slurry layer is dried, to form a positive electrode green sheet on the surface of the support base material. Examples of the drying method include natural drying, blast drying such as by hot blast, heating drying such as by infrared rays or far infrared rays, and vacuum drying. These drying methods may be used singly or in combination of two or more of them.

(Step of Forming Negative Electrode Precursor)

A negative electrode green sheet as the negative electrode precursor is formed as follows. First, a negative electrode active material, the lithium ion conductor (solid electrolyte) according to the first embodiment, an organic binder, and optionally a conductive agent are mixed together to prepare a negative electrode mixture powder as a raw material powder, after which the negative electrode mixture powder is dispersed in an organic solvent or the like, to obtain a negative electrode slurry as a negative electrode green sheet forming composition. A negative electrode green sheet is obtained in the same manner as in the "step of forming positive electrode precursor" described above, except for the use of the negative electrode slurry.

(Step of Forming Solid Electrolyte Precursor)

A solid electrolyte green sheet as a solid electrode layer precursor is formed as follows. First, the lithium ion conductor (solid electrolyte) according to the first embodiment and an organic binder are mixed together to prepare an electrolyte mixture powder as a raw material powder, after which the electrolyte mixture powder is dispersed in an organic solvent or the like, to obtain an electrolyte mixture slurry as a solid electrolyte green sheet forming composition. A solid electrolyte green sheet is obtained in the same manner as in the "step of forming positive electrode precursor" described above, except for the use of the electrolyte mixture slurry.

(Step of Stacking and Firing Precursors)

Using the positive electrode green sheet, the negative electrode green sheet, and the solid electrolyte green sheet obtained as aforementioned, a battery is manufactured as follows. First, the positive electrode green sheet and the negative electrode green sheet are stacked in such a manner as to sandwich the solid electrolyte green sheet therebetween, to obtain a stacked body. Thereafter, the stacked body is heated, and is pressed in such a manner that a pressure is exerted at least in the thickness direction of the stacked body. As a result, the organic binders contained in the respective green sheets constituting the stacked body are melted, and the respective green sheets constituting the stacked body are adhered to one another. Examples of a method of pressing while heating the stacked body include a hot press method, and warm isostatic press (WIP).

Next, if necessary, the stacked body is cut to predetermined size and shape. Subsequently, the stacked body is fired, to sinter the lithium ion conductor contained in the respective green sheets constituting the stacked body, and to burn away the organic binders.

The firing temperature for the stacked body is preferably not lower than the sintering temperature of the second lithium ion conductor and not higher than 600° C., more preferably not lower than the sintering temperature of the second lithium ion conductor and not higher than 500° C. Here, in the case where only one kind of lithium ion conductor is contained in the stacked body, the sintering temperature of the second lithium ion conductor means the sintering temperature of the second lithium ion conductor. On the other hand, in the case where two or more kinds of second lithium ion conductors are contained in the stacked body, the sintering temperature of the second lithium ion conductor means the maximum one of the sintering temperatures of the second lithium ion conductors.

When the firing temperature for the stacked body is not lower than the sintering temperature of the second lithium ion conductor, sintering of the second lithium ion conductor progresses, so that lithium ion conductivities of the positive electrode, the negative electrode, and the solid electrolyte layer can be enhanced. In addition, strengths of the positive electrode, the negative electrode, and the solid electrolyte layer can be enhanced. The reason why the firing temperature for the stacked body is set to be not higher than 600° C. or not higher than 500° C. is the same as the reason why the sintering temperature for the lithium ion conductor is set to be not higher than 600° C. or not higher than 500° C. as described in the first embodiment.

In the case where the second lithium ion conductor contains the oxide glass-based lithium ion conductor, the oxide glass-based lithium ion conductor may be vitrified in the firing step into an oxide glass ceramic-based lithium ion conductor. By the operations as above, the desired battery is obtained.

2.4 Effect

In the second embodiment of the present technology, the solid electrolyte contained in the positive electrode green sheet, the negative electrode green sheet, and the solid electrolyte green sheet is the lithium ion conductor according to the first embodiment, or the lithium ion conductor that can be sintered at a low temperature. Therefore, the firing temperatures for the positive electrode green sheet, the negative electrode green sheet, and the solid electrolyte green sheet can be made to be low temperatures. As a result, damages to the positive electrode active material and the negative electrode active material in the firing step of the stacked body can be restrained, and lowering in battery characteristics can be restrained. In addition, the choice of the kinds of the positive electrode active material and the negative electrode active material is broadened, and the degree of freedom in designing the battery is enhanced.

The positive electrode green sheet, the negative electrode green sheet, and the solid electrolyte green sheet can be collectively fired at a low temperature to thereby manufacture an all-solid battery. Therefore, the interface resistance between the positive electrode 11 and the solid electrolyte layer 13 and the interface resistance between the negative electrode 12 and the solid electrolyte layer 13 can be lowered, while restraining damages to the positive electrode 11, the negative electrode 12, and the solid electrolyte layer 13 due to firing.

Since the lithium ion conductor according to the first embodiment is sintered in the positive electrode 11 and the negative electrode 12, film strengths of the positive electrode 11 and the negative electrode 12 are high. Therefore, even in the case where the layer thicknesses of the positive electrode 11 and the negative electrode 12 are enlarged, battery performance can be maintained.

With the all-solid battery manufactured by use of the green sheet process, it is possible to eliminate exterior members or the like that do not contribute to battery capacity, or to reduce members such as exterior members that do not contribute to battery capacity, as compared to ordinary cylindrical-type, rectangular-type, or stack-type lithium ion batteries. Therefore, it is possible to enhance the occupancy rates of the positive electrode active material and the negative electrode active material based on the whole body of the battery or battery pack, and to enhance battery capacity (energy density).

Since the solid electrolyte is used as an electrolyte, safety is enhanced. Therefore, battery structure, a control circuit and the like can be simplified. Accordingly, volume energy density and weight energy density of the battery are enhanced.

2.5 Modifications

While an example in which the positive electrode and the negative electrode are configured using only the positive electrode active material layer and the negative electrode active material layer, respectively, has been described in the second embodiment above, the configurations of the positive electrode and the negative electrode are not limited to the above-described. For instance, as depicted in FIG. 2B, a positive electrode 21 may include a positive electrode collector 21A and a positive electrode active material layer 21B provided on one side of the positive electrode collector 21A. Also, a negative electrode 22 may include a negative electrode collector 22A and a negative electrode active material layer 22B provided on one side of the negative electrode collector 22A. In this case, the positive electrode 21 and the negative electrode 22 are stacked with the solid electrolyte layer 13 therebetween, in such a manner that the positive electrode active material layer 21B and the negative electrode active material layer 22B face each other. Note that the same or equivalent parts to those in the second embodiment above are denoted by the same reference symbols, and descriptions of them are omitted.

The positive electrode collector 21A contains a metal such as, for example, Al, Ni, and stainless steel. The shape of the positive electrode collector 21A is, for example, a foil-like shape, a plate-like shape, a mesh-like shape or the like. The positive electrode active material layer 21B is the same as or equivalent to the positive electrode (positive electrode active material layer) 11 in the second embodiment.

The negative electrode collector 22A contains a metal such as, for example, Cu and stainless steel. The shape of the negative electrode collector 22A is, for example, a foil-like shape, a plate-like shape, a mesh-like shape or the like. The negative electrode active material layer 22B is the same as or equivalent to the negative electrode (negative electrode active material layer) 12 in the second embodiment.

Note that a configuration may be adopted wherein one of the positive electrode 21 and the negative electrode 22 includes a collector and an active material layer, whereas the other includes only an active material layer.

While an example in which the present technology is applied to a battery using lithium as an electrode reactant has been described in the second embodiment above, the present technology is not limited to this example. The present technology may be applied to batteries in which, for example, other alkali metal such as Na or K, an alkaline earth metal such as Mg or Ca, or other metal such as Al or Ag is used as the electrode reactant.

While a case wherein the positive electrode precursor, the negative electrode precursor, and the solid electrolyte layer precursor are green sheets has been described as an example in the second embodiment above, the positive electrode precursor, the negative electrode precursor, and the solid electrolyte precursor may be green compacts. A configuration may be adopted wherein one or two layers selected from among the positive electrode precursor, the negative electrode precursor, and the solid electrolyte layer precursor are green sheets, and the remaining layer or layers is or are a green compact or compacts. The green compact as the positive electrode precursor is produced by pressure molding a positive electrode mixture powder by a pressing machine or the like. The green compact as the negative electrode precursor is produced by pressure molding a negative electrode mixture powder by a pressing machine or the like. The green compact as the solid electrolyte layer precursor is produced by pressure molding an electrolyte mixture powder by a pressing machine or the like. Note that the positive electrode mixture powder, the negative electrode mixture powder, and the electrolyte mixture powder may not contain an organic binder.

While an example wherein the positive electrode precursor, the solid electrolyte layer precursor, and the negative electrode precursor are stacked and then fired has been described in the second embodiment above, the positive electrode precursor, the solid electrolyte layer precursor, and the negative electrode precursor may be fired to form fired bodies (sintered bodies), followed by stacking these fired bodies to form a stacked body. In this case, the stacked body may not be fired after pressing of the stacked body, or the stacked body may be fired, as required, after pressing of the stacked body.

A method may be adopted wherein one or two layers of precursors selected from among the positive electrode precursor, the solid electrolyte layer precursor, and the negative electrode precursor are preliminarily fired to form fired bodies (sintered bodies), the remaining layer or layers is or are left as an unfired precursor or precursors, and the fired body or bodies and the precursor or precursors are stacked to form a stacked body. In this case, it is preferable to fire the stacked body after pressing of the stacked body.

A method may be adopted wherein two layers selected from among the positive electrode precursor, the solid electrolyte layer precursor, and the negative electrode precursor are preliminarily stacked and fired, the remaining unfired layer is stacked to the two layers, and the remaining one unfired layer is stacked on the stacked body to form a stacked body. In this case, it is preferable to fire the stacked body after pressing of the stacked body.

A method may be adopted wherein two layers of precursors selected from among the positive electrode precursor, the solid electrolyte layer precursor, and the negative electrode precursor are preliminarily stacked and fired, the remaining one layer of precursor is separately fired to form a fired body, and they are stacked together to form a stacked body. In this case, the stacked body may not be fired after pressing of the stacked body, or the stacked body may be fired, as required, after pressing of the stacked body.

While a case wherein the positive electrode precursor and the negative electrode precursor are formed by the positive electrode green sheet and the negative electrode green sheet, respectively, has been described as an example in the second embodiment above, at least one of the positive electrode precursor and the negative electrode precursor may be formed as follows.

Specifically, a positive electrode slurry may be applied or printed onto one side of the solid electrolyte layer precursor or the solid electrolyte layer, followed by drying to form the positive electrode precursor. Besides, a negative electrode slurry may be applied or printed onto the other side of the solid electrolyte layer precursor or the solid electrolyte layer, followed by drying to form the negative electrode precursor.

While a configuration wherein all of the positive electrode, the negative electrode, and the solid electrolyte layer contain a sintered body of the lithium ion conductor according to the first embodiment as a solid electrolyte has been described as an example in the second embodiment above, the present technology is not limited to this configuration. For instance, at least one layer selected from among the positive electrode, the negative electrode, and the solid electrolyte layer may contain a sintered body of the lithium ion conductor according to the first embodiment as a solid electrolyte. More specifically, a configuration may be adopted wherein one or two layers selected from among the positive electrode, the negative electrode, and the solid electrolyte layer contain a sintered body of the lithium ion conductor according to the first embodiment as a solid electrolyte, and the remaining layer or layers contain other lithium ion conductor than the lithium ion conductor according to the first embodiment as a solid electrolyte.

While a configuration wherein all of the positive electrode precursor, the negative electrode precursor, and the solid electrolyte layer precursor contain the lithium ion conductor according to the first embodiment has been described as an example in the second embodiment above, the present technology is not restricted to this configuration. For instance, at least one layer selected from among the positive electrode precursor, the negative electrode precursor, and the solid electrolyte layer precursor may contain the lithium ion conductor according to the first embodiment. More specifically, a configuration may be adopted wherein one or two layers selected from among the positive electrode precursor, the negative electrode precursor, and the solid electrolyte layer precursor contain the lithium ion conductor according to the first embodiment, and the remaining layer or layers contain other lithium ion conductor than the lithium ion conductor according to the first embodiment.

The other lithium ion conductor than the lithium ion conductor according to the first embodiment is not particularly limited so long as it can conduct lithium ions, and may be an inorganic or polymer-based lithium ion conductor. Examples of the inorganic lithium ion conductor include sulfides such as $Li_2S$—$P_2S_5$, $Li_2S$—$SiS_2$—$Li_3PO_4$, $Li_7P_3S_{11}$, $Li_{3.25}Ge_{0.25}P_{0.75}S$, $Li_{10}GeP_2S_{12}$, etc., and oxides such as $Li_7La_3Zr_2O_{12}$, $Li_{6.75}La_3Zr_{1.75}Nb_{0.25}O_{12}$, $Li_6BaLa_2Ta_2O_{12}$, $Li_{1+x}Al_xTi_{2-x}(PO_4)_3$, $La_{2/3-x}Li_{3x}TiO_3$, etc. Examples of the polymer-based lithium ion conductor include polyethylene oxide (PEO).

While a case wherein both the positive electrode and the negative electrode are electrodes containing a solid electrolyte has been described as an example in the second embodiment above, at least one of the positive electrode and the negative electrode may be an electrode that does not contain a solid electrolyte. In this case, the electrode that does not contain a solid electrolyte may be produced, for example, by a vapor phase growth method such as a vapor deposition method and a sputtering method.

While a step of pressing a stacked body and then firing the stacked body has been described as an example in the second embodiment above, a step of firing a stacked body while pressing the stacked body may be adopted.

A plurality of the batteries according to the second embodiment above may be stacked to configure a stacked type battery.

At least one layer selected from among the positive electrode, the negative electrode, and the solid electrolyte layer may contain a sintered body of the lithium ion conductor according to a modification of the first embodiment.

3 Third Embodiment

In a third embodiment, an electronic device including a secondary battery according to the second embodiment or a modification thereof will be described.

3.1 Configuration of Electronic Device

Figure 3:
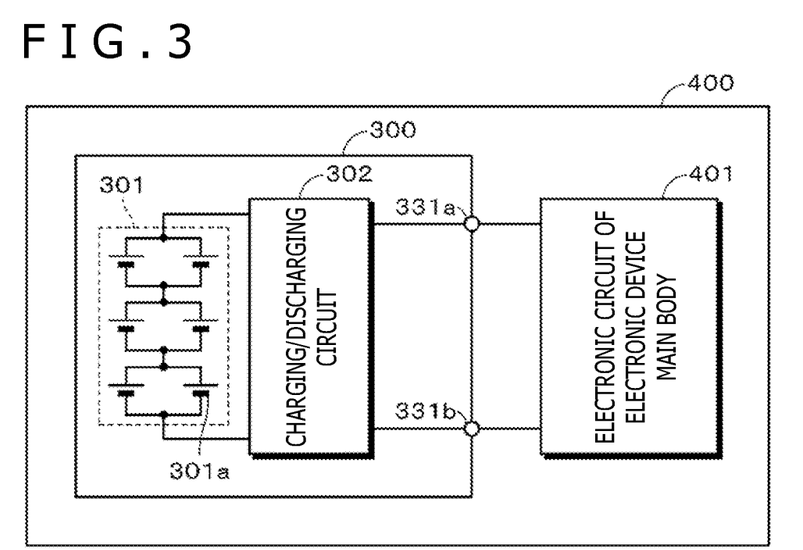
FIG. 3 is a block diagram depicting a configuration example of an electronic device according to a third embodiment of the present invention.

Referring to FIG. 3, an example of the configuration of an electronic device 400 according to a third embodiment of the present technology will be described below. The electronic device 400 includes an electronic circuit 401 of an electronic device main body, and a battery pack 300. The battery pack 300 is electrically connected to the electronic circuit 401 through a positive electrode terminal 331*a* and a negative electrode terminal 331*b*. The electronic device 400 is configured, for example, in such a manner that the battery pack 300 can be freely attached and detached by a user. Note that the configuration of the electronic device 400 is not restricted to this configuration, and a configuration may be adopted wherein the battery pack 300 is incorporated in the electronic device 400 such that the battery pack 300 cannot be detached from the electronic device 400 by the user.

At the time of charging the battery pack 300, the positive electrode terminal 331*a* and the negative electrode terminal 331*b* of the battery pack 300 are connected respectively to a positive electrode terminal and a negative electrode terminal of a charger (not depicted). On the other hand, at the time of discharging the battery pack 300 (at the time of using the electronic device 400), the positive electrode terminal 331*a* and the negative electrode terminal 331*b* of the battery pack 300 are connected respectively to a positive electrode terminal and a negative electrode terminal of the electronic circuit 401.

Examples of the electronic device 400 include notebook type personal computers, tablet type computers, mobile phones (e.g., smart phones), personal digital assistants (PDAs), imaging devices (e.g., digital still cameras, digital video cameras and the like), audio devices (e.g., portable audio players), game machines, cordless extension units, electronic books, electronic dictionaries, radio sets, headphones, navigation systems, memory cards, pace makers, hearing aids, illumination devices, toys, medical devices, and robots, but these are not restrictive.

(Electronic Circuit)

The electronic circuit 401 includes, for example, a central processing unit (CPU), a peripheral logic section, an interface section, a storage section and the like, and controls the electronic device 400 as a whole.

(Battery Pack)

The battery pack 300 includes an assembled battery 301 and a charging/discharging circuit 302. The assembled battery 301 is configured by connecting a plurality of secondary batteries 301*a* in series and/or in parallel. The plurality of secondary batteries 301*a* are connected, for example, in n-parallel and m-series (n and m are positive integers). Note that in FIG. 3, there is depicted an example in which six secondary batteries 301*a* are connected in 2-parallel and 3-series (2P3S). The plurality of secondary batteries 301*a* may constitute a stacked type secondary battery. As the secondary battery 301*a*, the battery according to the second embodiment or a modification thereof is used.

At the time of charging, the charging/discharging circuit 302 controls charging of the assembled battery 301. On the other hand, at the time of discharging (in other words, at the time of using the electronic device 400), the charging/discharging circuit 302 controls discharging for the electronic device 400.

3.2 Modifications

While a case wherein the electronic device 400 includes the assembled battery 301 composed of the plurality of secondary battery 301*a* has been described as an example in the third embodiment above, the electronic device 400 may include only one secondary battery 301*a* in place of the assembled battery 301.

While an example wherein the secondary battery according to the second embodiment or a modification thereof is applied to an electronic device has been described in the third embodiment above, the secondary battery according to the second embodiment or a modification thereof can also be applied to other devices than the electronic device. For instance, the secondary battery can be used in the state of being mounted on or for supplying electric power to driving power sources or auxiliary power sources of electric cars (inclusive of hybrid cars), railroad vehicles, golf carts, electric carts, road conditioners, signals, etc., power storage power sources for buildings such as houses or for power generation equipment, and so on. The secondary battery according to the second embodiment or a modification thereof can also be used as an electric storage device in a so-called smart grid. Such an electric storage device can not only supply electric power but also store electric power by being supplied with electric power from other electric power source. As the other electric power source, there can be used, for example, thermal power generation, nuclear power generation, hydraulic power generation, solar cells, wind power generation, geothermal power generation, fuel cells (inclusive of biofuel cells), and the like.

EXAMPLES

The present technology will be specifically described below by Examples, but the present technology is not to be limited to these Examples.

Example 1

First, a garnet type oxide crystal powder, specifically, a $Li_{6.75}La_3Zr_{1.75}Nb_{0.25}O_{12}$ powder was prepared, as a powder of an oxide crystal-based lithium ion conductor having a high ion conductivity (first lithium ion conductor). In addition, a glass powder containing $Li_2O$ and $SiO_2$ and $B_2O_3$ and $Y_2O_3$ in molar fractions of $Li_2O:SiO_2:B_2O_3:Y_2O_3=70.31:16.54:12.41:0.74$ was prepared, as a powder of an oxide glass-based lithium ion conductor having a low sintering temperature (second lithium ion conductor). Next, the garnet type oxide crystal powder and the glass powder were mixed in a weight ratio of garnet type oxide crystal powder:glass powder=70:30, the mixture was placed in a closed container together with 150 g of zirconia beads having a diameter of 10 mm, and mixing was conducted by rotation at 150 rpm for five hours.

Subsequently, the mixed powder was molded into the shape of a pellet having a diameter of 10 mm and a thickness of approximately 1 mm by use of a powder molding machine. Next, the thus produced pellet was sintered at a glass powder sintering temperature of 320° C. for 10 minutes. By these operations, a pellet-shaped solid electrolyte layer was obtained.

Example 2

A crystallized product of a glass powder containing $Li_2O$ and $SiO_2$ and $B_2O_3$ in molar fractions of $Li_2O:SiO_2:B_2O_3=70.83:16.67:12.5$ was prepared, as a powder of an oxide glass ceramic-based lithium ion conductor having a high ion conductivity (first lithium ion conductor). Besides, the crystallized glass powder and the glass powder were mixed in a weight ratio of crystallized glass powder:glass powder=50:50. A solid electrolyte layer was obtained in the same manner as in Example 1, except for the just-mentioned point.

Example 3

The crystallized glass powder and the glass powder were mixed in a weight ratio of crystallized glass powder:glass powder=70:30. A solid electrolyte layer was obtained in the same manner as in Example 2, except for the just-mentioned point.

Example 4

The crystallized glass powder and the glass powder were mixed in a weight ratio of crystallized glass powder:glass powder=80:20. A solid electrolyte layer was obtained in the same manner as in Example 2, except for the just-mentioned point.

Comparative Example 1

The garnet type oxide crystal powder and the glass powder were not mixed, and only the garnet type oxide crystal powder was used. A solid electrolyte layer was obtained in the same manner as in Example 1, except for the just-mentioned point.

Comparative Example 2

The garnet type oxide crystal powder and the glass powder were not mixed, and only the glass powder was used. A solid electrolyte layer was obtained in the same manner as in Example 1, except for the just-mentioned point.

Comparative Example 3

The crystallized glass powder and the glass powder were not mixed, and only the crystallized glass powder was used. A solid electrolyte layer was obtained in the same manner as in Example 2, except for the just-mentioned point.

(Lithium Ion Conductivity)

For the solid electrolyte layers of Examples 1 to 4 and Comparative Examples 1 to 3 obtained as above-mentioned, lithium ion conductivity was measured as follows. First, Pt was sputtered onto both sides of the sintered solid electrolyte layer in a size of a diameter of 5 mm. Next, using an impedance measuring device (made by Toyo Technica Inc.), alternating-current impedance measurement (frequency: $10^{+6}$ to $10^{-1}$ Hz, voltage: 100 mV and 1,000 mV) of the solid electrolyte layers formed with electrodes was conducted to obtain lithium ion conductivity. The results are set forth in Table 2.

Table 2 depicts the configurations and evaluation results of the solid electrolyte layers of Examples 1 to 4 and Comparative Examples 1 to 3.

Note that the sintering temperature of the garnet type oxide crystal (first lithium ion conductor) in Example 1 and Comparative Example 1 is more than 600° C. On the other hand, the sintering temperature of the crystal glass (first lithium ion conductor) in Examples 2 to 4 and Comparative Example 3 is not more than 600° C.

From Table 1, the followings are seen.

In the hybrid materials containing the crystal and the glass, a high lithium ion conductivity could be realized, as compared to the crystal alone.

In addition, in the hybrid materials containing the crystallized glass and the glass, a high lithium ion conductivity could be realized, as compared to the crystallized glass alone.

While the embodiments, modifications thereof, and Examples of the present technology have been specifically described above, the present technology is not limited to the embodiments, modifications thereof, and Examples described above, and various modifications based on the technical thought of the present technology are possible.

For instance, the configurations, methods, steps, shapes, materials, numerical values and the like mentioned in the embodiments, modifications thereof, and Examples described above are merely examples, and configurations, methods, steps, shapes, materials, numerical values and the like different from the above-mentioned ones may be used, as required.

In addition, the configurations, methods, steps, shapes, materials, numerical values and the like in the embodiments, modifications thereof, and Examples described above can be combined with one another, without departing from the gist of the present technology.

Besides, the present technology can also adopt the following configurations.

(1)

A lithium ion conductor including
a first lithium ion conductor that contains at least one selected from among oxide crystals and glass ceramics, and
a second lithium ion conductor that has a sintering temperature of not more than 600° C.,
in which a lithium ion conductivity of the first lithium ion conductor is higher than a lithium ion conductivity of the second lithium ion conductor.

TABLE 2

| | First lithium ion conductor (High ion conduction material) | | | Second lithium ion conductor (Low sintering temperature material) | | | | |
| --- | --- | --- | --- | --- | --- | --- | --- | --- |
| | | Average particle diameter (μm) | Content (vol %) | Content (wt %) | Kind | Particle diameter (μm) | Content (vol %) | Content (wt %) | Ion conductivity (S/cm) |
| | Kind | | | | | | | | |
| Example 1 | Garnet type oxide crystal | 48 | 50 | 70 | Glass | 1 to 15 | 50 | 30 | $7.6 \times 10^{-7}$ |
| Example 2 | Crystallized glass | 31 | 50 | 50 | Glass | 1 to 15 | 50 | 50 | $5.9 \times 10^{-7}$ |
| Example 3 | Crystallized glass | 31 | 70 | 70 | Glass | 1 to 15 | 30 | 30 | $6.5 \times 10^{-7}$ |
| Example 4 | Crystallized glass | 31 | 80 | 80 | Glass | 1 to 15 | 20 | 20 | $6.7 \times 10^{-7}$ |
| Comparative Example 1 | Garnet type oxide crystal | 48 | 100 | 100 | — | — | — | — | $<10^{-10}$ |
| Comparative Example 2 | Glass | 5 | 100 | 100 | — | — | — | — | $2.1 \times 10^{-7}$ |
| Comparative Example 3 | Crystallized glass | 31 | 100 | 100 | — | — | — | — | $4.9 \times 10^{-7}$ |

(2)
The lithium ion conductor as described in (1), in which the first lithium ion conductor and the second lithium ion conductor contain an oxide.
(3)
The lithium ion conductor as described in (1) or (2), in which a sintering temperature of the first lithium ion conductor exceeds 600° C.
(4)
The lithium ion conductor as described in any one of (1) to (3), in which the second lithium ion conductor contains a glass.
(5)
The lithium ion conductor as described in (4), in which the glass contains at least one selected from among Ge (germanium), Si (silicon), B (boron), and P (phosphorus), as well as Li (lithium) and O (oxygen).
(6)
The lithium ion conductor as described in any one of (1) to (5), in which in a state where the second lithium ion conductor has been sintered, the lithium ion conductivity of the lithium ion conductor is not less than $5 \times 10^{-7}$ S/cm.
(7)
The lithium ion conductor as described in any one of (1) to (6), in which an average particle diameter of the first lithium ion conductor is not less than an average particle diameter of the second lithium ion conductor.
(8)
The lithium ion conductor as described in any one of (1) to (7), in which a proportion by volume of the first lithium ion conductor is not less than a proportion by volume of the second lithium ion conductor.
(9)
The lithium ion conductor as described in any one of (1) to (8), in which the sintering temperature of the second lithium ion conductor is 300° C. to 500° C.
(10)
A solid electrolyte layer including the lithium ion conductor as described in any one of (1) to (9).
(11)
The solid electrolyte layer as described in (10), in which the second lithium ion conductor has been sintered.
(12)
The solid electrolyte layer as described in (10) or (11), in which the second lithium ion conductor is connecting portions of the first lithium ion conductor.
(13)
An electrode including
the lithium ion conductor as described in any one of (1) to (9), and
an active material.
(14)
The electrode as described in (13), in which the active material includes a carbon material.
(15)
A battery including
a positive electrode,
a negative electrode, and
an electrolyte layer,
in which at least one of the positive electrode, the negative electrode, and the electrolyte layer includes the lithium ion conductor as described in any one of (1) to (9).
(16)
An electronic device including
the battery as described in (15),
in which the electronic device is supplied with electric power from the battery.

REFERENCE SIGNS LIST 11, 21 Positive electrode
12, 22 Negative electrode
13 Solid electrolyte layer
21A Positive electrode collector
21B Positive electrode active material layer
22A Negative electrode collector
22B Negative electrode active material layer
300 Battery pack
301 Assembled battery
301a Secondary battery
302 Charging/discharging circuit
400 Electronic device
401 Electronic circuit

What is claimed is:
1. A lithium ion conductor comprising:
a first lithium ion conductor that contains at least one of oxide crystals and crystallized glass; and
a second lithium ion conductor that is sintered at a temperature of not more than 600° C.,
wherein a lithium ion conductivity of the first lithium ion conductor is higher than a lithium ion conductivity of the second lithium ion conductor,
wherein the second lithium ion conductor contains a glass, and
wherein the glass contains at least one of a germanium, a silicon, a boron, and a phosphorus material, as well as lithium and oxygen.
2. The lithium ion conductor according to claim 1, wherein the first lithium ion conductor and the second lithium ion conductor contain an oxide.
3. The lithium ion conductor according to claim 1, wherein the first lithium ion conductor is sintered at a temperature of greater than 600° C.
4. The lithium ion conductor according to claim 1, wherein in a state where the second lithium ion conductor has been sintered, the lithium ion conductivity of the lithium ion conductor is not less than $5 \times 10^{-7}$ S/cm.
5. The lithium ion conductor according to claim 1, wherein an average particle diameter of the first lithium ion conductor is not less than an average particle diameter of the second lithium ion conductor.
6. The lithium ion conductor according to claim 1, wherein a proportion by volume of the first lithium ion conductor is not less than a proportion by volume of the second lithium ion conductor.
7. The lithium ion conductor according to claim 1, wherein the sintering temperature of the second lithium ion conductor is 300° C. to 500° C.
8. A solid electrolyte layer comprising:
the lithium ion conductor according to claim 1.
9. The solid electrolyte layer according to claim 8, wherein the second lithium ion conductor has been sintered.
10. The solid electrolyte layer according to claim 8, wherein the second lithium ion conductor is connecting portions of the first lithium ion conductor.
11. An electrode comprising:
the lithium ion conductor according to claim 1; and
an active material.
12. The electrode according to claim 11, wherein the active material includes a carbon material.
13. A battery comprising:
a positive electrode;
a negative electrode; and
an electrolyte layer, wherein at least one of the positive electrode, the negative electrode, and the electrolyte layer includes the lithium ion conductor according to claim 1.

14. An electronic device comprising:
the battery according to claim 13, wherein the electronic device is supplied with electric power from the battery.

15. The lithium ion conductor according to claim 1, wherein a sintering temperature of the first lithium ion conductor exceeds 600° C., and wherein the first lithium ion conductor is mixed with the second lithium ion conductor to form the lithium ion conductor.

16. The lithium ion conductor according to claim 1, wherein the lithium ion conductor has a firing temperature of not more than 600° C.

17. The lithium ion conductor according to claim 1, wherein the first lithium ion conductor and the second lithium ion conductor are connected physically and ion-conductively to form the lithium ion conductor.

18. The lithium ion conductor according to claim 1, wherein the first lithium ion conductor and the second lithium ion conductor are connected physically and ion-conductively by the sintering temperature.

* * * * *